US006772506B2

(12) United States Patent
Toensing (10) Patent No.: US 6,772,506 B2
(45) Date of Patent: Aug. 10, 2004

(54) METHOD FOR DETACHING SWAGED COMPONENTS OF A DISC DRIVE

(75) Inventor: Eyvand Ernest Toensing, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 129 days.

(21) Appl. No.: 09/867,171

(22) Filed: May 29, 2001

(65) Prior Publication Data

US 2001/0027602 A1 Oct. 11, 2001

Related U.S. Application Data

(62) Division of application No. 08/946,762, filed on Oct. 8, 1997, now Pat. No. 6,269,532.
(60) Provisional application No. 60/045,820, filed on May 5, 1997.

(51) Int. Cl.[7] ............................ G11B 5/127; G11B 5/50; B23P 19/04
(52) U.S. Cl. ............................ 29/603.02; 29/603.03; 29/603.04; 29/426.5; 29/426.6; 360/244.6; 360/265.7
(58) Field of Search ........................... 29/603.2, 603.04, 29/603.03, 737, 762, 426.4, 426.5, 426.6, 603.09; 360/244.5, 244.6, 265.7, 265.9; 403/274, 277, 275, 280, 282

(56) References Cited

U.S. PATENT DOCUMENTS

| 4,991,045 A | * | 2/1991 | Oberg | 360/244.03 |
| 5,012,367 A | * | 4/1991 | Toensing | 29/426.5 |
| 5,097,584 A | * | 3/1992 | Cain et al. | 29/603.03 |
| 5,193,260 A | * | 3/1993 | Pierce | 29/426.5 |
| 5,259,689 A | * | 11/1993 | Arand et al. | 403/282 |
| 5,262,911 A | * | 11/1993 | Cain et al. | 29/603.02 |
| 5,347,413 A | * | 9/1994 | Hanke et al. | 29/603.02 |
| 5,557,839 A | * | 9/1996 | Mastache et al. | 29/603.03 |
| 5,706,574 A | * | 1/1998 | Shimanuki | 29/603.03 |
| 5,757,586 A | * | 5/1998 | Budde | 29/268 |
| 5,842,270 A | * | 12/1998 | Tucker et al. | 29/603.03 |
| 5,848,469 A | * | 12/1998 | O'Conner et al. | 403/277 |

FOREIGN PATENT DOCUMENTS

JP 5-307842 * 11/1993

* cited by examiner

Primary Examiner—A. Dexter Tugbang
(74) Attorney, Agent, or Firm—Westman, Champlin & Kelly, P.A.

(57) ABSTRACT

A method for detaching a suspension assembly adapted to support a head staked to an actuator arm of an actuator block of a disc drive. The method includes the steps of inserting an expandable device having an expandable flanged end, expanding a dimension of the inserted flanged end and moving the device to release the suspension assembly staked to the actuator arm.

10 Claims, 13 Drawing Sheets

METHOD FOR DETACHING SWAGED COMPONENTS OF A DISC DRIVE

CROSS-REFERENCE TO RELATED APPLICATION

This application is a divisional of U.S. application Ser. No. 08/946,762, filed Oct. 8, 1997 now U.S. Pat. No. 6,269,532, and entitled "IMPROVED DEVICE FOR DETACHING SWAGED COMPONENTS IN A DISC DRIVE which claims priority to Provisional Application Serial No. 60/045,820, filed May 5, 1997, and entitled "SWAGING FLEXURES TO E-BLOCK ARMS".

FIELD OF THE INVENTION

The present invention relates to a disc drive storage system. In particular, the present invention relates to a device for removing a suspension system supporting a head gimbal assembly from an actuator arm.

BACKGROUND OF THE INVENTION

Disc drives are well-known in the industry. Disc drives are used to store digital information on rigid discs coated with a magnetizable material and a plurality of circular, concentric data tracks. Discs are mounted on a spindle motor, which rotates the discs for operation. Information is read from or written to the disc surface via transducers carried on a slider, supported relative to the disc surface via a suspension system.

The suspension assembly includes a load beam and a gimbal spring for supporting the slider. The slider is coupled to the gimbal spring at an upper surface of the slider. The gimbal spring is also coupled to the load beam. The lower surface of the slider defines an air bearing surface. Rotation of a disc via the spindle motor interacts with the air bearing surface of the slider to create a hydrodynamic lifting force to lift the slider to fly above the disc surface for reading information from and writing information to the disc surface. The gimbal spring supports the slider to allow the slider to pitch and roll relative to the disc surface for operation. The load beam supplies a preload force to counteract the hydrodynamic lifting force of the slider The preload force supplied by the load beam, and the hydrodynamic lifting force created by the air bearing surface and rotation of the disc, define the fly characteristics of the slider (and transducer) above the disc surface.

The slider is positioned relative to various concentric data tracks via an actuator mechanism. The actuator mechanism typically includes an "E-block" assembly, which is rotationally coupled to a base of the disc drive to define a rotary-type actuator. The "E-block" includes a plurality of spaced actuator arms and is rotationally operated via an actuator drive under the control of electronic circuitry. In particular, the suspension assemblies supporting the slider are coupled to actuator arms of an "E-block" in alignment with upper and lower surfaces of discs supported by the spindle motor.

The suspension assemblies are coupled to actuator arms via a swaging technique. The suspension assemblies each include a tubular-shaped stake having an open central channel extending therethrough. The outer dimension of the stake is sized for insertion into a hole extending through an actuator arm of the "E-block". After the stake is inserted into the hole, the stake is swaged (radially deformed) to the hole of the actuator arm to secure the suspension assembly to the actuator arm. Typically, suspension assemblies are coupled to opposed surfaces of an actuator arm for alignment relative to upper and lower disc surfaces. In particular, a tubular-shaped stake of a first suspension assembly is inserted into an upper portion of the hole such that extended ends of the stake extend downwardly from the fixed end. The stake is coupled to the upper portion of the hole for alignment relative to an upper disc surface. A stake of a second suspension assembly is inserted into a lower portion of the hole such that extended ends of the stake extend upwardly from a fixed end. The stake is coupled to the lower portion of the hole for alignment relative to a lower disc surface. A swaging device is inserted through the central channel of stakes positioned in the hole to impart a swaging force to deform the stakes against the wall of the hole for permanently connecting suspension assemblies to the actuator arms.

Oftentimes, single heads in an "E-block" will be defective, and it will be desirable to remove that head from the "E-block" for replacement so that the entire "E-block" does not need to be discarded. Thus, in order to disconnect a defective suspension assembly (or head) from an actuator arm, it is necessary to release the force holding the stake to the actuator arm so that the suspension assembly may be released. Adjacent suspension assemblies fixed to adjacent actuator arms are positioned in close proximity; and, accordingly, it is difficult to release a single stake from an actuator arm without degrading or affecting the other suspension assemblies. Thus, it is desirable to provide a system for removing or "deswaging" stakes of suspension assemblies having defective heads from actuator arms without degrading adjacent suspension assemblies on the same "E-block".

SUMMARY OF THE INVENTION

The present invention relates to a device for detaching a suspension assembly, adapted to support a head, staked to an actuator arm of an actuator block of a disc drive. The device includes an expandable device operable between an insertion dimension and a deswaging dimension and a deswaging dimension having a flanged end defining a deswaging surface for forcing the stake from a hole of the actuator arm. In the insertion dimension, the device is sized for insertion through channels of tubular stakes for placement relative to an extended end of the stake. The device is expanded to the deswaging dimension, so that the deswaging surface of the flanged end aligns with an end surface of the stake for removing the stake from the actuator block.

Thus, the expandable device is inserted through the tubular stakes deformed within a hole of the actuator arm for placement of the flanged end relative to an extended end of the stake. The device is expanded to the deswaging dimension so that the flanged end of the device aligns with a ring surface of the stake. The device is then advanced to force the stake from the hole of the actuator arm. Since the device internally forces the stakes from the holes, the device does not interfere with other components of the actuator arm during operation so that stakes can be removed without significant damage to the actuator block. These and various other features as well as advantages which characterize the present invention will be apparent upon reading of the following detailed description and review of the associated drawings.

DETAILED DESCRIPTION OF THE PREFERRED EMBODIMENTS

Figure 1:
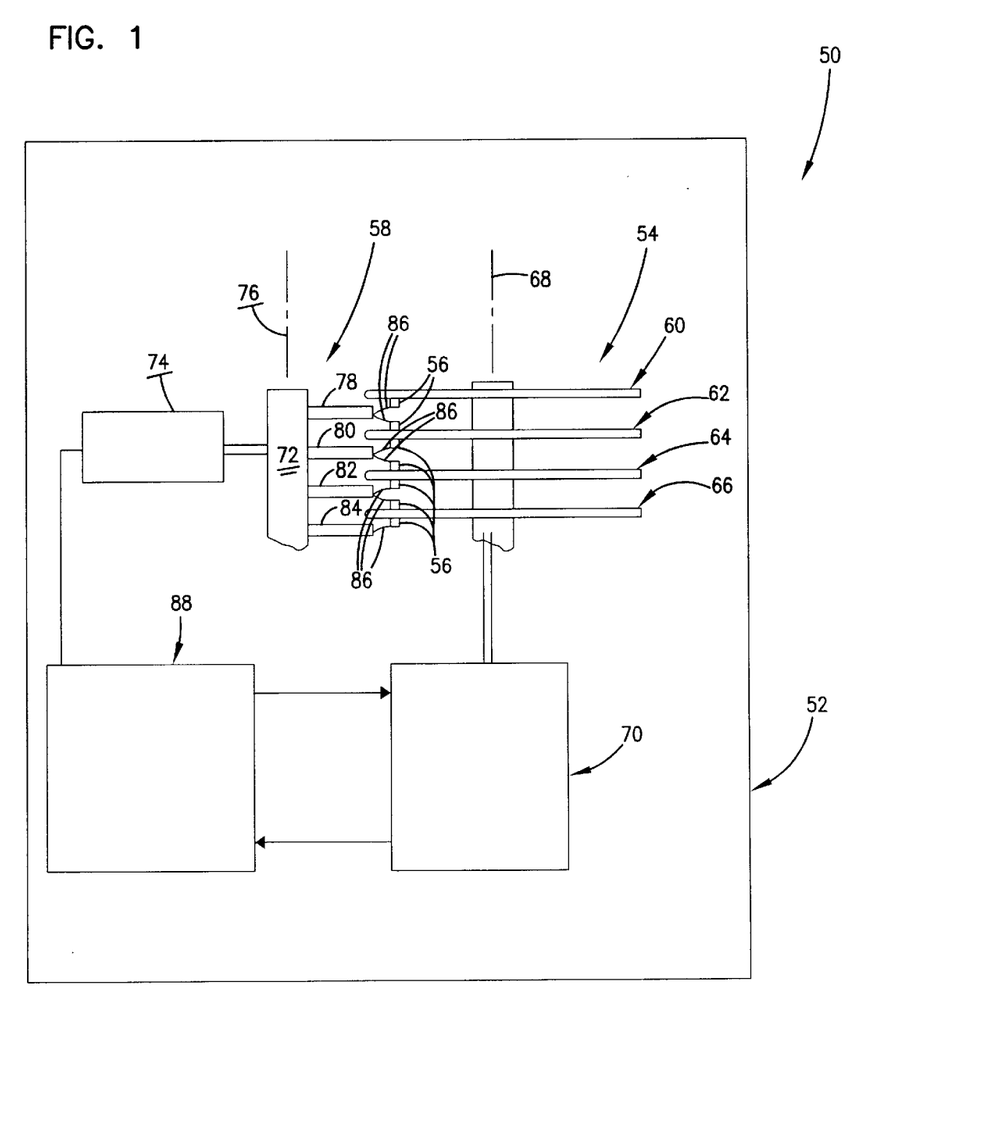
FIG. 1 is a schematic view of a disc drive.

FIG. 1 is a schematic view illustrating a disc drive 50. As shown, disc drive 50 includes housing 52 (shown schematically), disc stack 54, and a plurality of head gimbal assemblies (HGAs) 56, which are supported relative to disc stack 54 and actuated by actuator assembly 58. Disc stack 54 includes a plurality of discs 60, 62, 64, and 66, supported for co-rotation about spindle axis 68 by a spindle motor 70. The head gimbal assemblies 56 support a disc head slider via a gimbal spring (not shown) for reading information from and writing information to upper and lower disc surfaces in a known manner.

The actuator assembly 58 includes actuator block 72 and actuator drive 74. Actuator block 72 is rotationally coupled to housing 52 for operation about pivot axis 76 in a known manner. Although a rotary-type actuator is described, it should be understood that the invention is not limited to a rotary actuator system and that other actuators, such as a linear actuator, may be employed. A plurality of spaced, stacked actuator arms 78, 80, 82, 84 extend from the actuator block 72 in alignment with upper and lower surfaces of discs 60, 62, 64, and 66. The HGAs 56 are coupled to actuator arms 78, 80, 82, 84 via load beams 86.

As shown, a first actuator arm, such as actuator arm 78, supports HGA 56 in alignment with an upper disc surface of disc 62; and an adjacent actuator arm, such as actuator arm 80, supports HGA 56 in alignment with a lower disc surface of disc 62. Actuator drive 74, which is typically a voice coil motor, pivots actuator block 72 about the pivot axis 76 for alignment with selected data tracks of discs 60, 62, 64, and 66. Operation of the spindle motor 70 and actuator drive 74 are controlled via control circuitry 88 of disc drive 50. Although the disc stack 54 shown includes four (4) discs, it should be understood that the disc stack 54 may include any number of discs, and the disc drive is not limited to the specific embodiment described.

Figure 2:
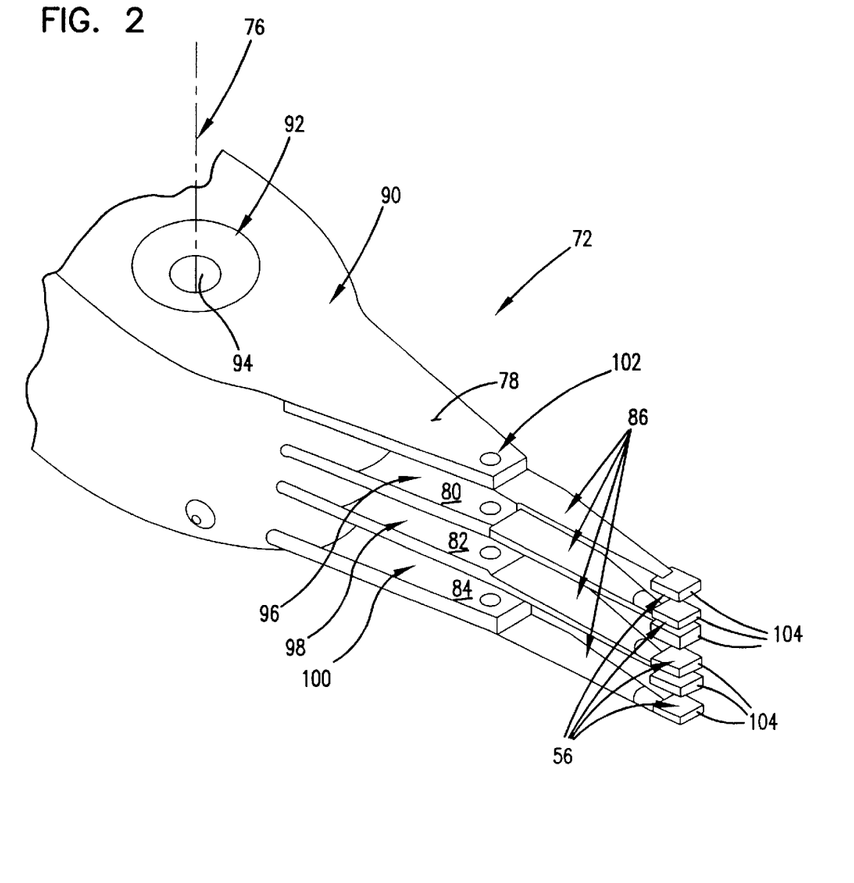
FIG. 2 is a perspective view of an "E-block" for supporting data heads for reading information from and writing information to selected data tracks.

FIG. 2 illustrates the actuator block 72 for supporting HGAs 56. The actuator block 72 is rotationally coupled to housing 52 and includes a main portion 90. The main portion 90 includes bearing 92 and shaft bore 94 for rotationally coupling the actuator block 72 to housing 52. A plurality of actuator arms 78, 80, 82, 84 are typically integrally formed with the main portion 90, and extend from main portion 90 to define an "E-block" shaped structure. The actuator arms 78, 80, 82, 84 are supported in a spaced relation to define gaps 96, 98, and 100 therebetween, respectively. The actuator arms 78, 80, 82, 84 include a mounting hole 102. As previously explained, the HGAs 56 are coupled to load beam 86 and are supported thereby. The load beam 86 and HGAs 56 define a suspension assembly. The HGAs 56 include slider 104 carrying transducers (not shown) for reading data from and writing data to discs. Suspension assemblies are coupled to the actuator arms 78, 80, 82, 84 for flexibly supporting sliders 104.

Figure 3:
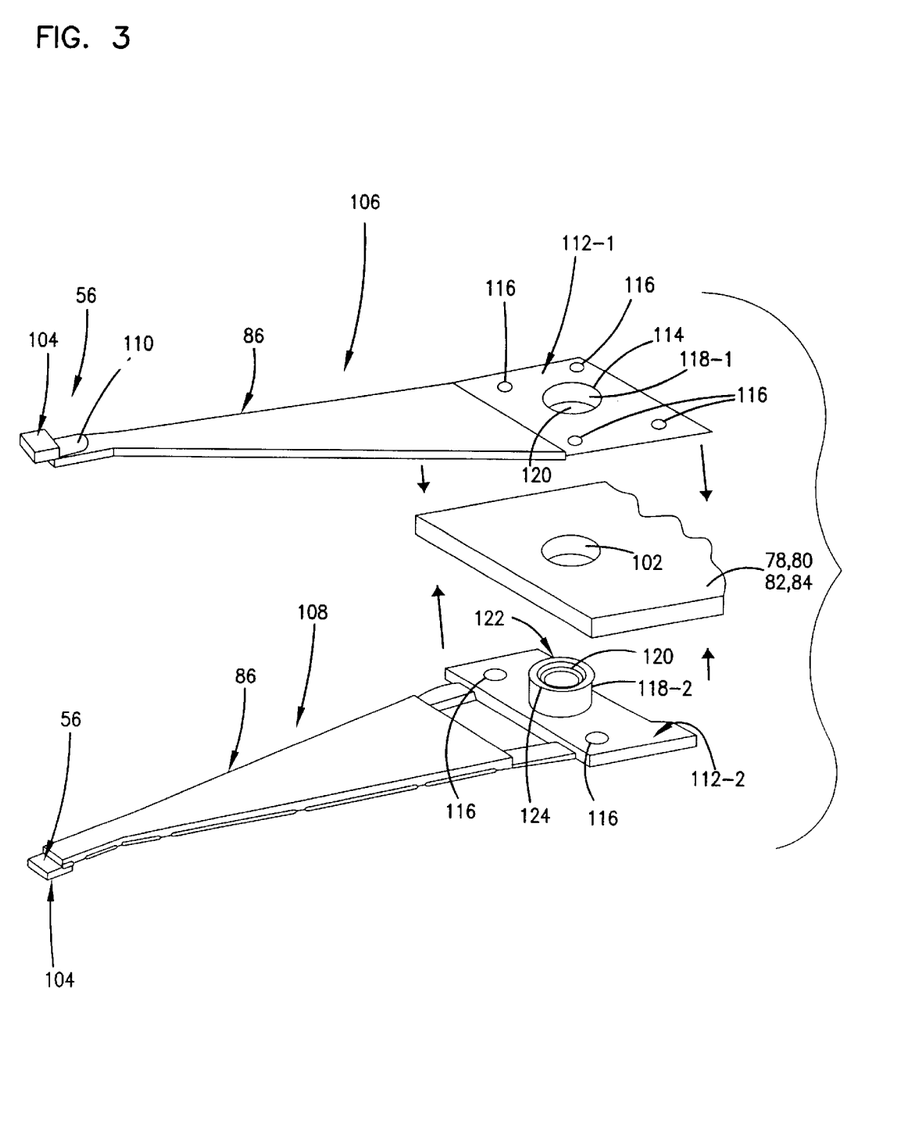
FIG. 3 is an exploded view of a suspension assembly coupled to an actuator arm of an "E-block".

FIG. 3 is an exploded view illustrating assembly of first and second suspension assemblies 106, 108 to an actuator arm to support suspension assemblies 106, 108 for operation. Sliders 104 of HGAs 56 are supported relative to the load beam via gimbal spring 110 in a known manner. As shown, suspension assemblies 106, 108 include a mounting plate 112, which is generally fixedly coupled to an elongated flexible portion defining the load beam 86 in a known manner. Mounting plate 112 includes a mounting opening 114 and a plurality of spaced holes 116. Tubular-shaped stakes 118 having a central opened channel 120 extend from mounting plate 112 with channel 120 in alignment with mounting opening 114. Stakes 118 may be separately or integrally formed with mounting plate 112. In particular, a fixed end of stake 118 is coupled to mounting plate 112, and an extended end 122 of stake 118 is spaced from mounting plate 112. The tubular shape of stakes 118 defines a ring-shaped face 124 at an extended end of stakes 118. Preferably, the diameter of the mounting opening 114 is similar to the diameter of channel 120 to define an opened single-diameter channel extending through mounting plate 112 and stake 118.

The outer circumference of the tubular stake 118 is sized for insertion into hole 102 of actuator arms 78, 80, 82, 84. As shown in FIG. 3, the first suspension assembly 106 is aligned to position the slider 104 upwardly, and stake 118 (i.e. extended end) extends downwardly for insertion into the upper portion of hold 102 to define an upper stake 118-1 for supporting the head (slider 104) to read information from and write information to a lower disc surface. The second suspension assembly 108 is aligned to position slider 104 downwardly and stake 118-2 (i.e. extended end 122) upwardly for insertion into the lower portion of hole 102 to define a lower stake 118-2 for supporting the head relative to an upper disc surface.

The extended length of stakes 118-1, 118-2 is designed for partial insertion into mounting hole 102 such that there is a gap between extended ends 122 of inserted stakes 118-1 and 118-2. Stakes 118-1 and 118-2 are formed of a malleable material, such as metal; and, after stakes 118-1 and 118-2 are inserted into hole 102, stakes 118-1 and 118-2 are deformed outwardly or radially to contact hole 102 (essentially at extended ends 122) by a swaging technique to secure stakes 118-1 and 118-2 to actuator arms 78, 80, 82, 84. As shown, depending upon the arrangement of the actuator arms and discs, not all actuator arms include first and second suspension assemblies. For example, actuator arm 84 supports a suspension assembly for alignment with a lower surface of disc 66 via stake 118-1 and does not support a second suspension assembly.

As previously explained, each actuator block 72 includes multiple actuator arms 78, 80, 82, 84, supporting multiple heads to read to and write from multiple discs of a disc stack 54. Oftentimes, a single head, supported relative to one of the actuator arms 78, 80, 82, 84, may be defective. As previously explained, heads are typically coupled to actuator arms 78, 80, 82, 84, by swaging or radially-deforming a stake 118 relative to hole 102. Thus, in order to disconnect a defective suspension assembly 106, 108 (i.e., mounting plate 112) from an actuator arm 78, 80, 82, 84, it is necessary to release the radially-deformed stake 118 from the surface of hole 102.

Figure 4:
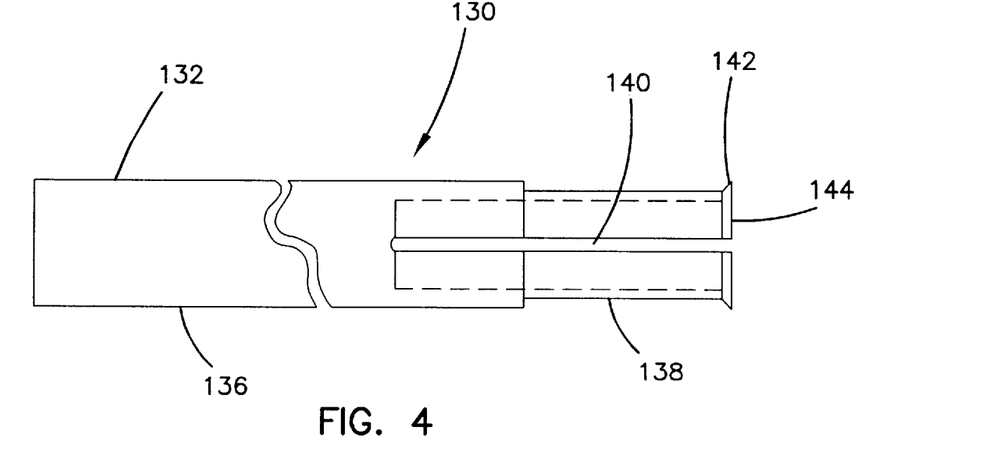
FIG. 4 is a plan elevational view of an embodiment of a deswaging rod of the present invention.
Figure 5:
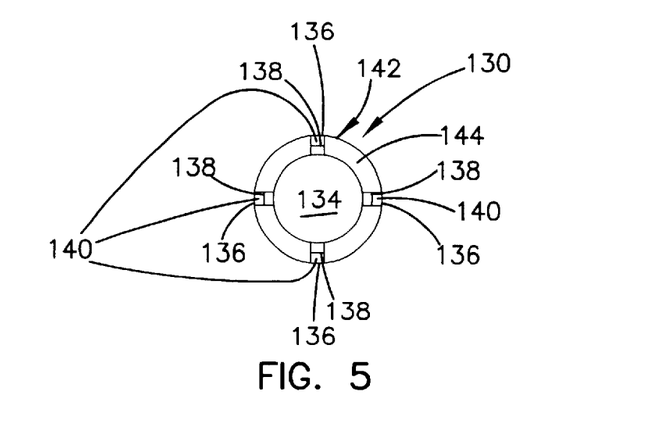
FIG. 5 is an end view of the deswaging rod of FIG. 4.

FIGS. 4–5 illustrate an embodiment of a deswaging rod 130 of the present invention for removing or "deswaging" the radially-deformed stakes 118 from hole 102 of actuator arms 78, 80, 82, 84 to release a defective head from the actuator block 72. As shown, the deswaging rod is formed of an elongated, cylindrical member 132. The cylindrical member 132 includes first and second stepped-diameter portions 136, 138, a plurality of elongated slits 140 spaced about the circumference of the cylindrical member and an outwardly-tapered flanged end 142 forming a deswaging face 144. Slits 140 open to bore 134 located at the center of first portion 136 and the center of a small part of second portion 138 near first portion 136. Preferably, four slits 140 are included; however, any number of slits 140 may be used, as long as at least one slit 140 is included for expansion. The slits 140 extend along a portion of the first diameter portion 136 and along the second diameter portion 138 from flanged end 142 to a distance spaced from flanged end 142. The deswaging face 144 provides a surface for forcing stakes 118 from holes 102, as will be explained. Although a particular embodiment of the rod 130 is shown, it should be understood that the invention is not limited to the particular rod 130 shown.

Figure 6:
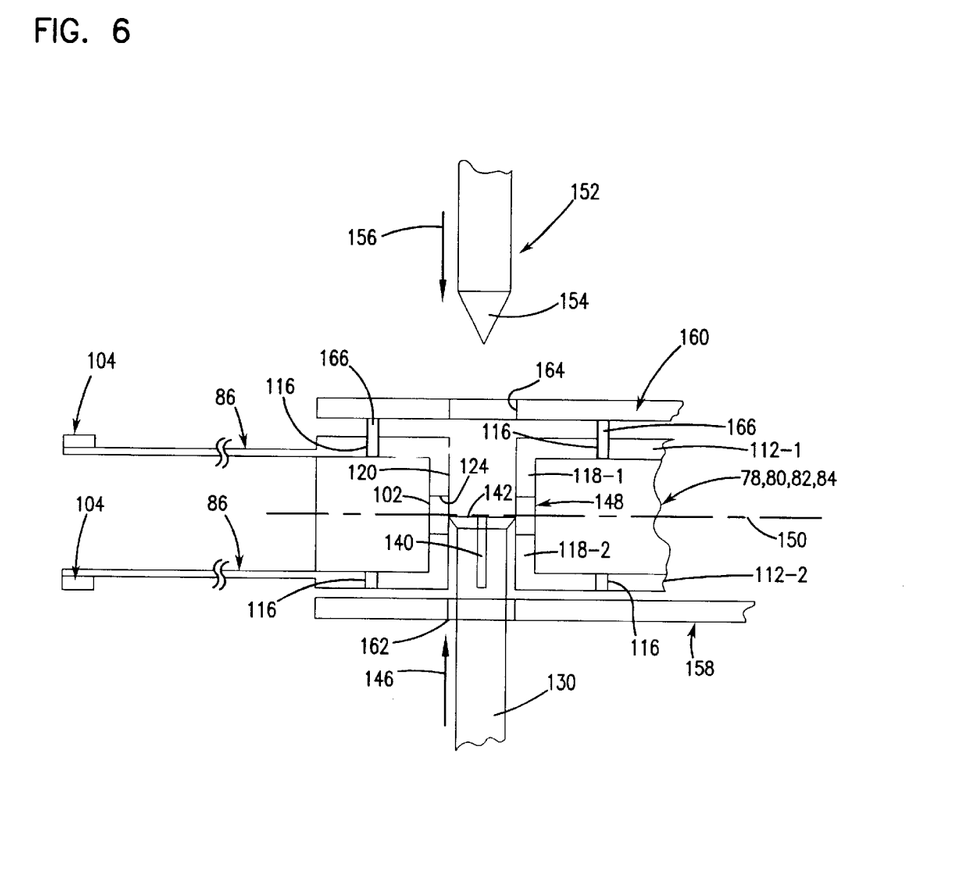
FIG. 6 is an illustrative view showing insertion of a deswaging rod through stakes of suspension assemblies coupled to an actuator arm for deswaging operation.
Figure 7:
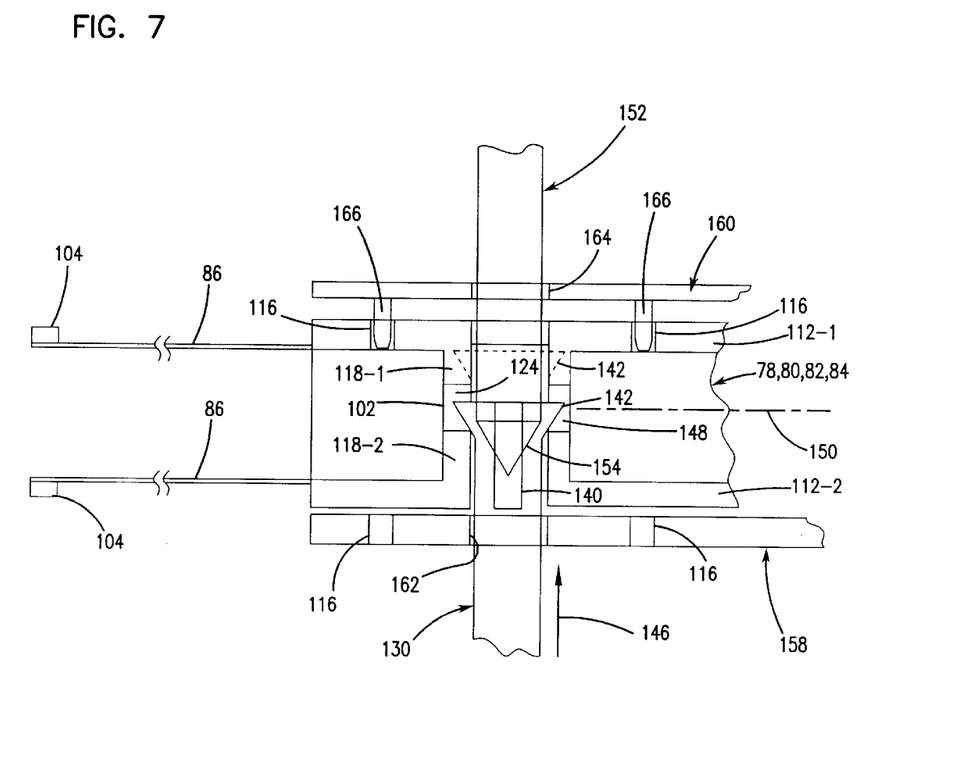
FIG. 7 is an illustrative view similar to FIG. 6, illustrating insertion of an actuator rod through a central channel of the deswaging rod for expanding the deswaging rod for operation.

FIGS. 6 and 7 illustrate operation of deswaging rod 130 for removing stakes 118 from an actuator arm 78, 80, 82, 84. The deswaging rod 130 is sized for insertion through channel 120 of stakes 118 and holes 102 of actuator arms 78, 80, 82, 84. As shown in FIG. 6, to remove stake 118-1, the rod 130 is inserted through stake 118-2, as illustrated by arrow 146. The rod 130 is advanced until flanged end 142 is aligned within gap 148 between extended ends of stakes 118-1, 118-2 at a center axis 150 of the actuator arm 78, 80, 82, 84 and gap 148. The flanged end 142 of the rod 130 is aligned at center axis 150 to define an operating position of the rod 130 for removing stake 118-1.

For operation, rod 130 is expanded via slits 140 from an insertion dimension to an enlarged deswaging dimension to align flanged end 142 (and swaging face 144) with face 124 to force stake 118 from hole 102 as will be explained. As shown in FIGS. 6–7, the rod 130 is expanded via a cylinder-shaped actuator rod 152 having a conical tip 154. The diameter of rod 152 is sized for insertion into central bore 150 of rod 130 to expand deswaging rod 134 via slits 140. Although an actuator rod 152 is shown, it should be understood that alternate devices may be used to expand rod 130 and the invention is not limited to rod 152. Actuator rod 152 is inserted, as illustrated by arrow 156, (in opposite direction to arrow 146) through stake 118-1 to align with the flanged end 142 of rod 130.

Opposed plates 158, 160, having holes 162, 164 are supported in alignment with selected actuator arms 78, 80, 82, 84. Holes 162, 164 of opposed plates 158, 160 are coaxially aligned with hole 102 to facilitate insertion of rod 130 and rod 152 therethrough for operation. Plate 160 includes prongs 166 extending therefrom to define a biasing plate. Prongs 166 are arranged for alignment and insertion into holes 116 in mounting plate 112-1. Prongs 166 extend through holes 116 to provide a biasing force to actuator arms, 78, 80, 82, 84, reactive to the force supplied to face 124, as will be explained.

After the deswaging rod 130 is positioned at the operating position (shown in FIG. 6) and expanded to the deswaging dimension, the rod 130 is then advanced along a deswaging stroke in direction of arrow 146 to push stake 118-1 from hole 102. The rod 130 is advanced to an extended position, shown in phantom in FIG. 7 to force stake 118-1 from hole 102. While, rod 130 is advanced and supplies force to stake 118-1, plate 160 supplies a reactive force via prongs 166 to the actuator arms 78, 80, 82, 84 to limit movement of the actuator arm so that the force of the rod 130 is directed to stake 118-1 and moves stake 118-1 relative to the actuator arm and out of hole 102.

Figure 8:
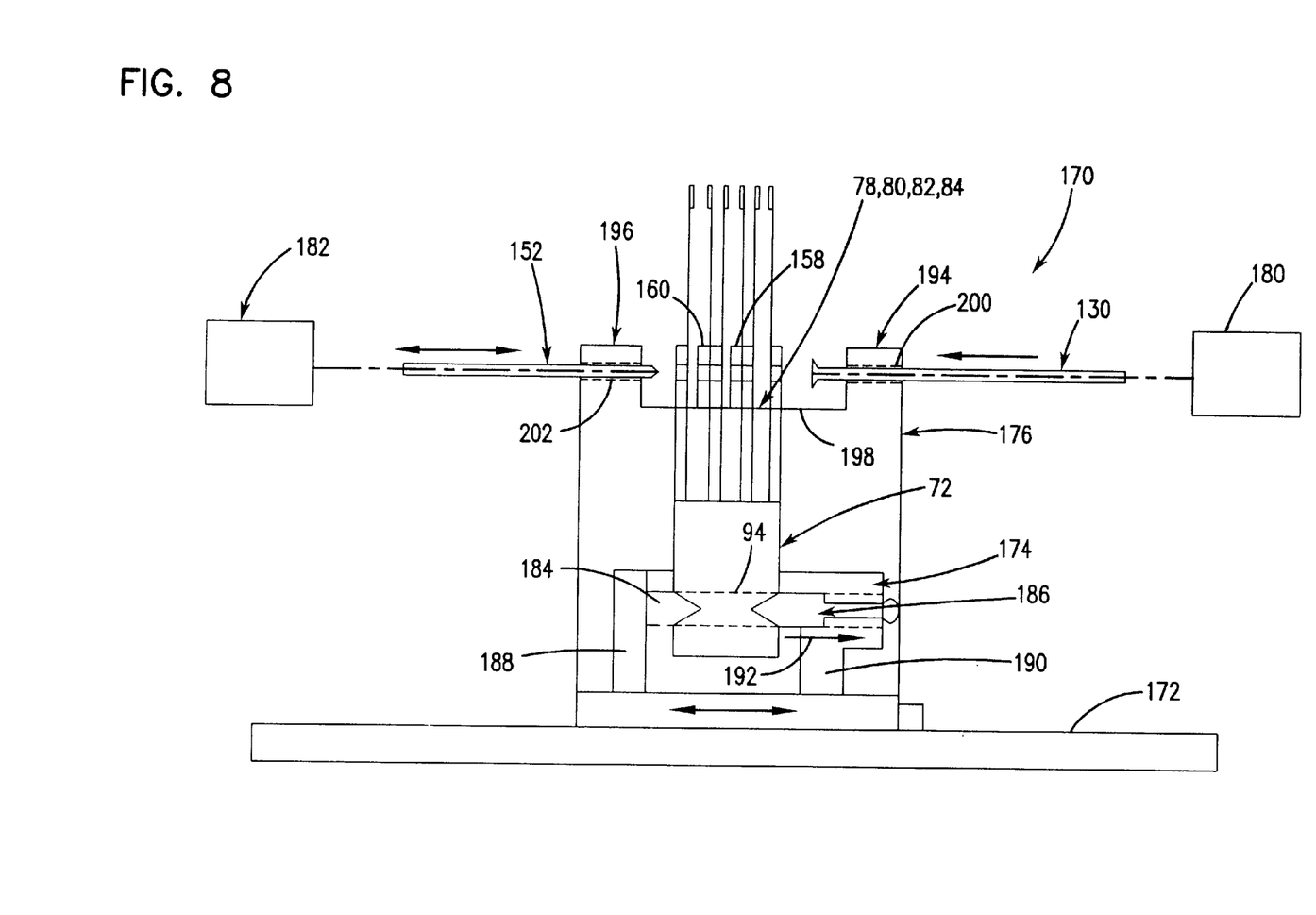
FIG. 8 is a schematic illustration of a deswaging apparatus for operating the deswaging rod and actuator rod for removing a suspension assembly staked to an actuator arm.

Preferably, operation of the deswaging rod 130 and actuator rod 152 is controlled by a deswaging apparatus 170. FIG. 8 is a diagrammatic view of one embodiment of a deswaging apparatus 170 for operating rod 130. As shown, the deswaging apparatus 170 includes a base 172, block support fixture 174, swaging fixture block 176, deswaging rod drive assembly 180, and actuating rod drive assembly 182. The block support fixture 174 is used to support actuator block 72 for deswaging operation. The block support fixture 174 includes a fixed pin 184 and a movable pin 186 having diameters sized to extend through shaft bore 94 to support "E" block 72. Fixed pin 184 is supported by block 188, and movable pin 186 is supported by block 190. Blocks 188, 190 are movably coupled to base 172 as will be explained. Movable pin 186 is normally biased toward pin 184 and moves in the direction of arrow 192 for selectively inserting and releasing pin 186 from shaft bore 94. In particular, movable pin 186 is retracted from pin 184 to insert fixed pin 184 into bore 94 of "E"-block 72 and then released so that pin 186 is inserted through bore 94 to secure the actuator block 72 relative to the deswaging apparatus 170. To remove the actuator block 72, pin 186 is retracted as illustrated by arrow 192 so that pins 184, 186 are removed from shaft bore 94.

Swaging fixture block 176 is coupled to base 172 and includes arms 194, 196, and seat 198. Arms 194, 196 include a deswaging rod channel 200 and an actuating rod channel 202, respectively. Deswaging rod 130 extends through channel 200 and is operated via drive assembly 180 (shown schematically); and actuator rod 152 extends through channel 202 and is operated via drive assembly 182 (shown schematically). Actuator arms 78, 80, 82, 84 of actuator block 72 are supported at seat 198 with stakes 118 aligned with rod 130. Seat 198 supports plates 158, 160 in alignment with actuator arms 78, 80, 82, 84 and rods 130,152

Figure 9:
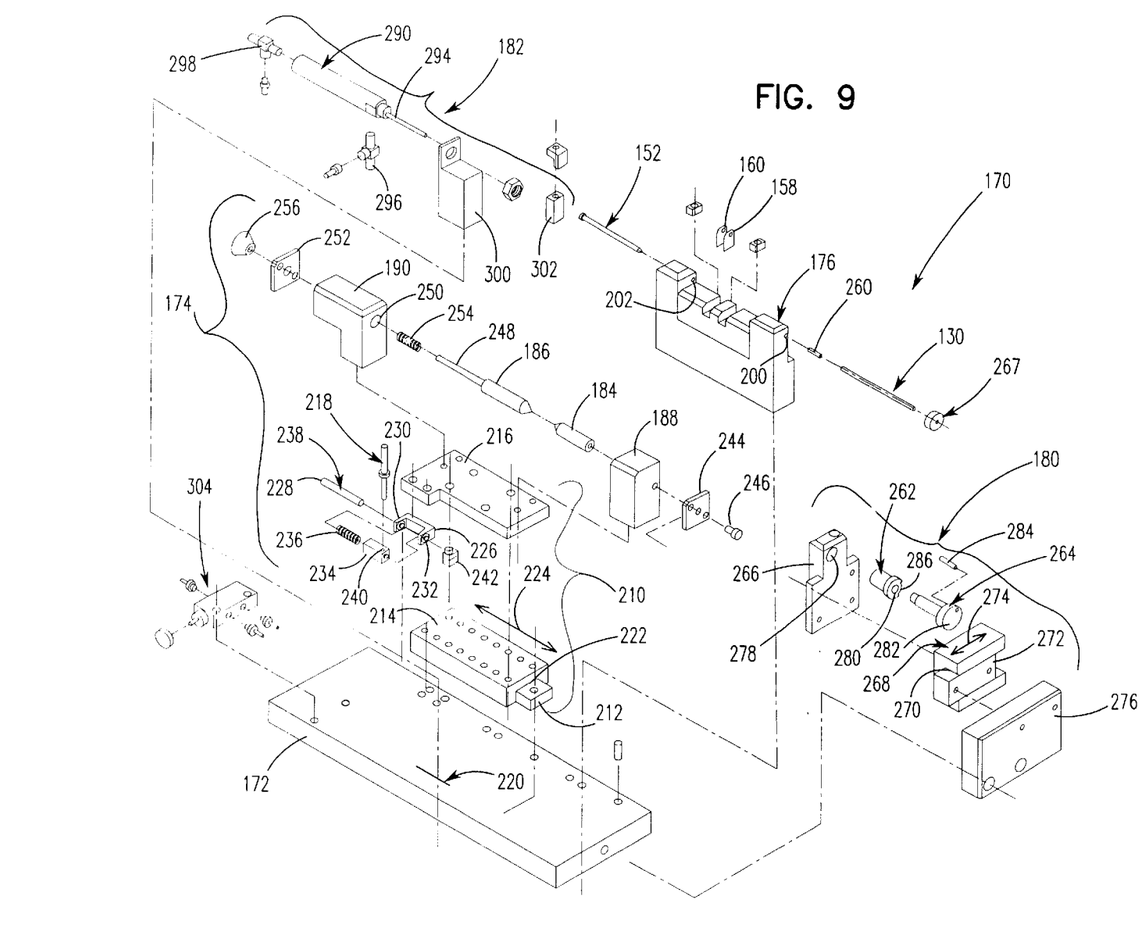
FIG. 9 is a more detailed exploded view of an embodiment of a deswaging apparatus for operating the deswaging rod and actuator rod.

As previously explained, block support fixture 174 (i.e., block 188, 190) is movably supported relative to base 172 via a slide detent assembly 210, as shown in FIG. 9. The slide detent assembly 210 includes a slide track 212, slide 214, platform 216, detent pin 218, and graduated detent holes 220. The slide track 212 is fixedly supported relative to base 172. Slide 214 includes a slide recess 222 aligned relative to slide track 212 so that slide 214 moves along slide track 212, as illustrated by arrow 224. Platform 216 is fixedly coupled to slide 214 for supporting blocks 188, 190 and detent pin 218. Detent pin 218 is supported relative to platform 216 in alignment with graduated detent holes 220, formed on base 172.

Plate 160 defines a reference plate or member for operation. Slide 214 movably supports block support fixture 174 relative to swaging fixture block 176 for aligning selected actuator arms 78, 80, 82, 84 relative to plate 160 for deswaging. Detent holes 220 are positioned on base 172 at graduated locations for selective alignment of each actuator arm 78 80, 82, 84, relative to reference plate 160. Pin 218 extends through a selected detent hole 220, depending upon the particular actuator arm 78, 80, 82, 84 being deswaged. Detent pin 218 is supported relative to platform 216 via bracket 226, which is fixed to platform 216 and has shaft 228 supported between arms 230, 232 of bracket 226. Shaft 228 extends through support block 234, which is biased toward arm 232 via spring 236. Block 234 and shaft 228 include pin holes 238, 240. Pin 218 extends through pin holes 238, 240 for insertion into a selected detent hole 220. Shaft 228 is secured between arms 230, 232 via clamp 242. Thus, depending upon which actuator arm 78, 80, 82, 84 supports the defective head, slide 214 is moved to align the selected actuator arm 78, 80, 82, 84, relative to plate 160. In particular, pin 218 is withdrawn from a selected detent hole 220 so that platform 216 and slide 214 move relative to base 172 to an alternate alignment. Thereafter, pin 218 is released for insertion into the desired detent hole 220.

Blocks 188, 190 are fixedly coupled to platform 216. Pin 184 is fixed to block 188 via plate 244 and fastener 246. The fastener may be any known fastener. Pin 186 is movably coupled to block 190 via extension rod 248 which extends from end of pin 186 through bore 250 of block 190 and is secured to plate 252. The length of extension rod 248 and pin 186 is sufficient so that the pin 186 moves between a retracted position and an extended position. Pin 186 (and extension rod 248) are normally biased toward pin 184 via spring 254 to secure actuator block 72. Knob 256 is coupled to extension rod 248 to force rod 248 against the spring bias to retract pin 186 as illustrated by arrow 192 to either mount or remove actuator block 72. Thereafter, knob 256 is released so that pin 186 is biased toward pin 184 to support block 72 via bore 94. It should be noted that the orientation of the fixed pin 188 and movable pin 190 are different in FIGS. 8 and 9 and the invention is not limited to any particular orientation.

Rod drive assembly 180 is coupled to deswaging rod 132 for operation. Deswaging rod 132 is normally biased in a retracted position via spring 260. Deswaging rod drive assembly 180 includes a calibration member 262 and a stroke rod 264. The stroke rod 264 is aligned with an extended end of rod 130 to force rod 130 against the spring bias for operation. Calibration member 262 aligns stroke rod 264 so that the stroke rod 264 positions rod 130 at the operation position at the center axis 150 of the particular actuator arm having the stake removed. The stroke rod 264 moves rod 130 between the operating position and the extended position of the deswaging stroke of rod 130.

Stroke rod 264 is movably supported relative to rod 130 via drive block 266. Drive block 266 moves stroke rod 264 between an engaging position and a non-engaging position. In the engaging position, the stroke rod 264 contacts an end 267 of the rod 130 to position the rod 130 in gap 148 at the operating position. In the non-engaging position, the stroke rod 264 is out of alignment with rod 130 so that rod 130 may be withdrawn for loading and unloading an "E"-block 72. Block 266 is coupled to slide 268 for selective placement of the stroke rod 264 in the engaging position and the non-engaging position. Slide 268 includes a recess 270, which is sized to move along slide track 272, as illustrated by arrow 274. Slide track 272 is stationarily supported via block 276, secured to base 172. Thus, during non-use, drive block 266, supporting rod 264, may be moved out of alignment, as illustrated by arrow 274, so that deswaging rod 130 may be retracted for removal or insertion of rod 130 through holes 102 of actuator arms. For deswaging operation, drive block 266 is moved to support stroke rod 264 in the engaging position to move rod 130 along the deswaging stroke.

The operating position of stroke rod 264 is precalibrated relative to reference plate 160 via calibration member 262 so that when block 266 supports stroke rod 264 in the engaging position, and mounting plate 112 is aligned relative to plate 160, flanged end 142 is aligned in gap 148 at center axis 150. The extent of the stroke of rod 264 (between a retracted position and an extended position) corresponds to the distance from center axis 150 to the end of hole 102 to remove the stake 118.

Calibration member 262 is an externally-threaded cylindrical member and extends through threaded bore 278 of drive block 266 for movement within said threaded bore 278. Calibration member 262 includes internally-threaded bore 280 to support stroke rod 264 which is externally threaded and is sized to extend through internally-threaded bore 280. Stroke rod 264 includes knob 282 and control pin 284. Control pin 284 is aligned with a slot 286 on knob 288 of calibration member 262 to define the stroke of the rod 264 between the retracted position and the extended position.

Rod drive assembly 182 drives rod 152 via an actuation cylinder 290 having an operating rod 294 reciprocating therein to move between a retracted position and an extended position. Preferably, cylinder 290 is a pneumatic cylinder. Valve control ports 296, 298 control air pressure to extend and retract operating rod 294. Actuation cylinder 290 is supported relative to base 172 via block 300, coupled to base 172. Movement of the operating rod 294 is transferred to the rod 152 via a coupler 302 to insert rod 152 into rod 130 to expand rod 130 to the deswaging dimension. Actuator mechanism 304 selectively supplies pressure to valve control ports 296, 298 to extend and retract rod 294.

Figure 10:
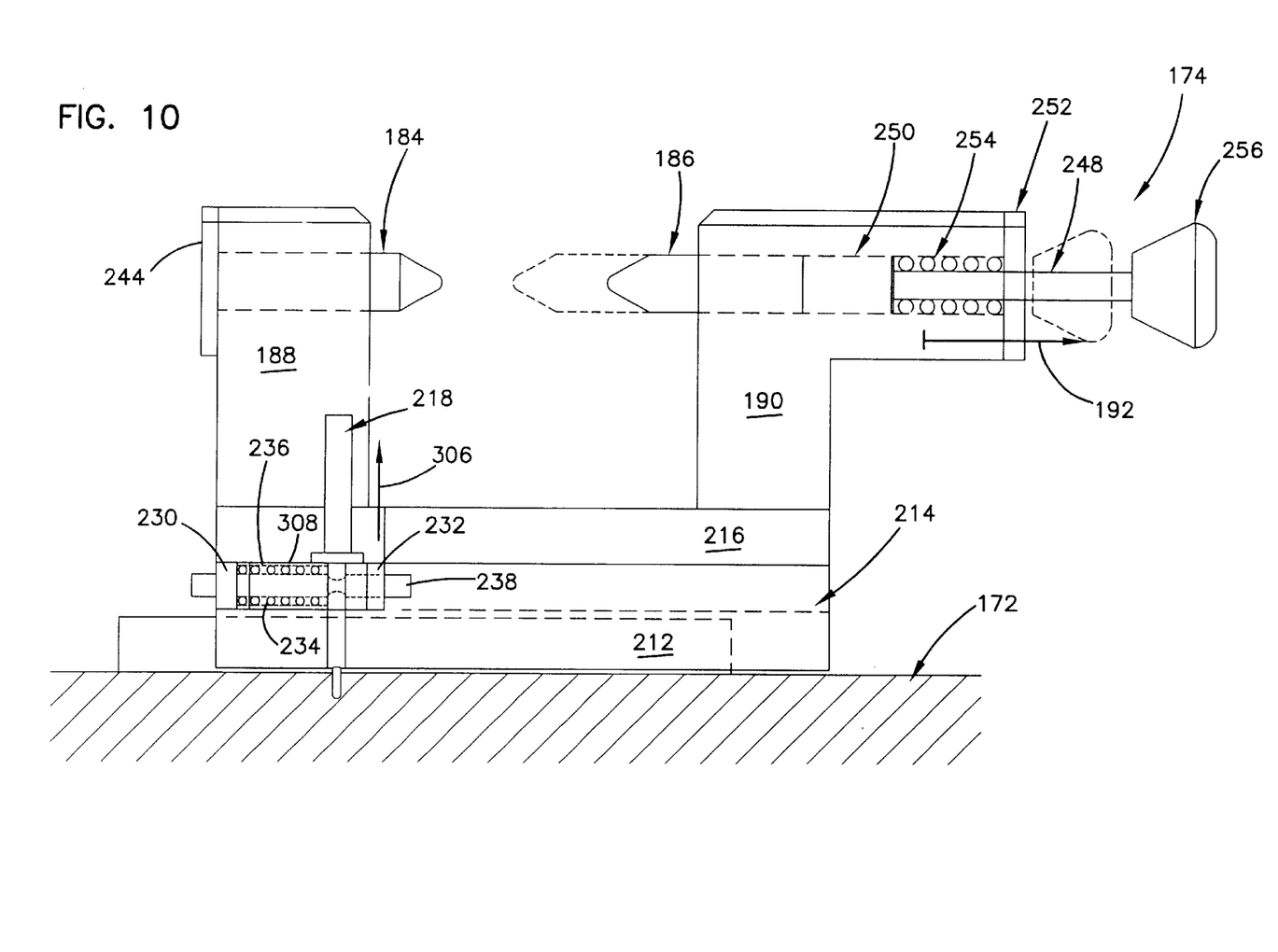
FIG. 10 is a side view illustrating an actuator block support fixture for supporting an "E-block" for deswaging a suspension assembly staked to an actuator arm.

FIG. 10 is a side view of the block support fixture 174, illustrating operation of the movable pin 186 between an extended position, shown in phantom, and a retracted position for loading and unloading an actuator block 72 (not shown). As shown, spring 254 operates within a cavity defined between extension rod 248; and through bore 250 to normally biases the pin 186 to the extended position, shown in phantom. Thereafter, knob 256 may be pulled, as illustrated by arrow 192, to force the pin 186 against the spring bias to retract pin 186 for loading and unloading "E-block" 72.

As previously explained, the block support fixture 174 is movably supported relative to swaging fixture block 176 via slide 214, movable along slide track 212, fixed to base 172 of the device. As illustrated in FIG. 10, pin 218 secures the slide relative to base 172 via detent holes 220 (shown in FIG. 9) to selectively position a desired actuator arm 78, 80, 82, 84 relative to plate 160 for deswaging. Adjacent detent holes 220 are spaced to sequentially align adjacent actuator arms relative to plate 160 for deswaging. The pin 218 is retracted, as illustrated by arrow 306, to allow the slide 214 to move. As shown, the pin 218 extends through block 234, which is biased via spring 236, as previously explained. In particular, block 234 includes an internal chamber 308. Spring 236 extends about rod 238 in chamber 308 to bias block 234 toward arm 232 for alignment of hole 240 with pin 218.

Actuator arms support upper and lower suspension assemblies 106, 108 coupled to the actuator arms via opposed stakes 118-1, 118-2. To remove stake 118-1, the actuator or "E"-block 72 is mounted to aligned the extended end or face 124 of stake 118-1 relative to the flanged end 142 of rod 130 and mounting plate 112-1 adjacent reference plate 160. To remove stake 118-2, the "E"-block is unloaded and turned to align the extended end or face 124 of stake 118-2 relative to the flanged end 142 of rod 130 and mounting plate 112-2 adjacent to plate 160.

Figure 11:
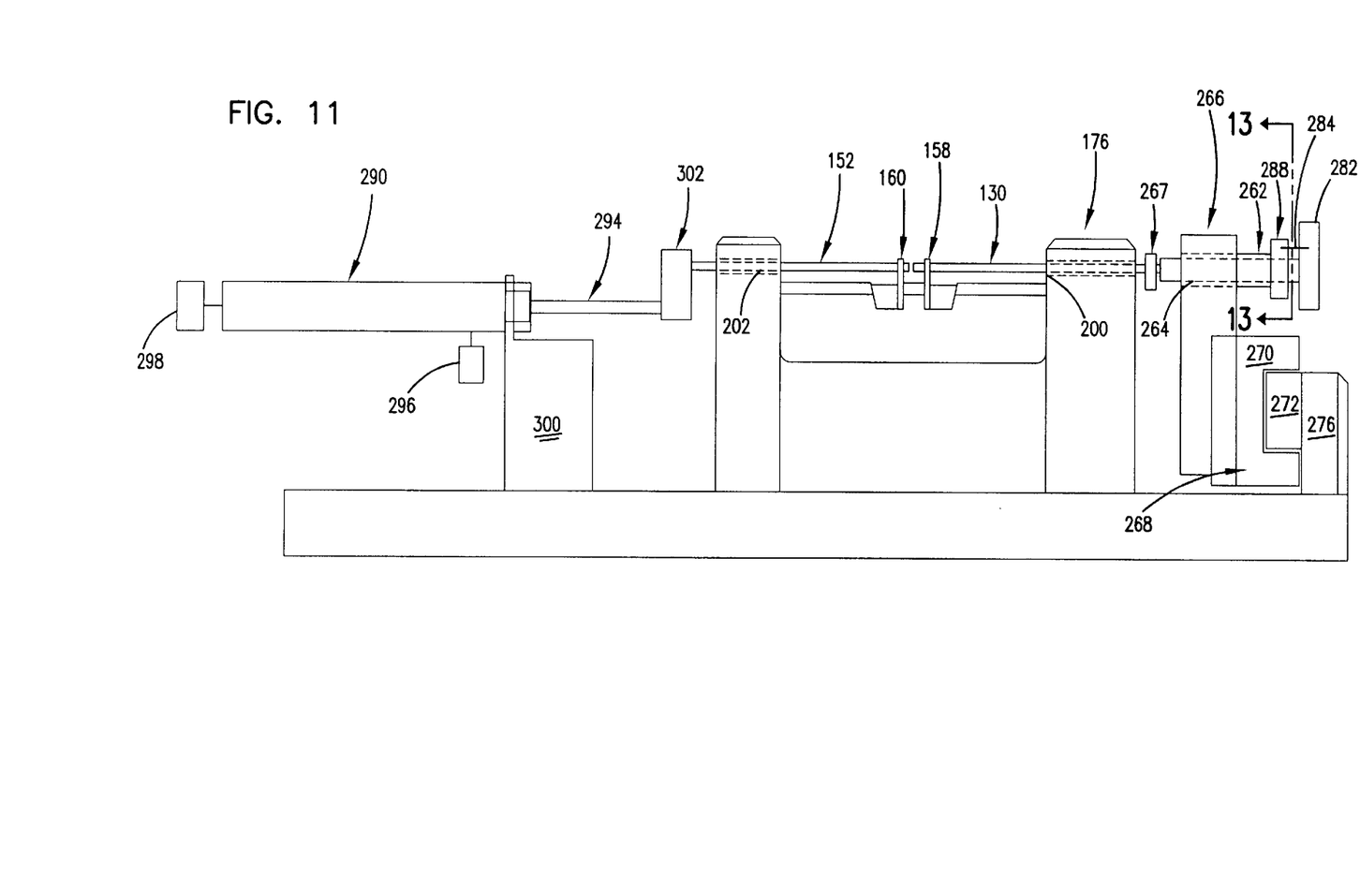
FIG. 11 is a side elevational view of an embodiment of a deswaging apparatus incorporating drive assemblies for actuating the deswaging rod and actuator rod.

FIG. 11 is a detailed side view of the deswaging fixture block 176. In the non-engaging position, slide 268 supports stroke rod 264 out of alignment with the deswaging rod 132 so that rod 130 may be retracted while "E" block 72 is mounted and rod 130 is inserted through holes 102 of actuator arms. As previously explained, the mounting plate 112 (and stake 118) to be removed is aligned relative to plate 160 and prongs 166 are inserted through holes 116. Slide 214 is moved (arrow 224) to position the selected mounting plate 112 relative to reference plate 160 for deswaging operation.

Figure 12:
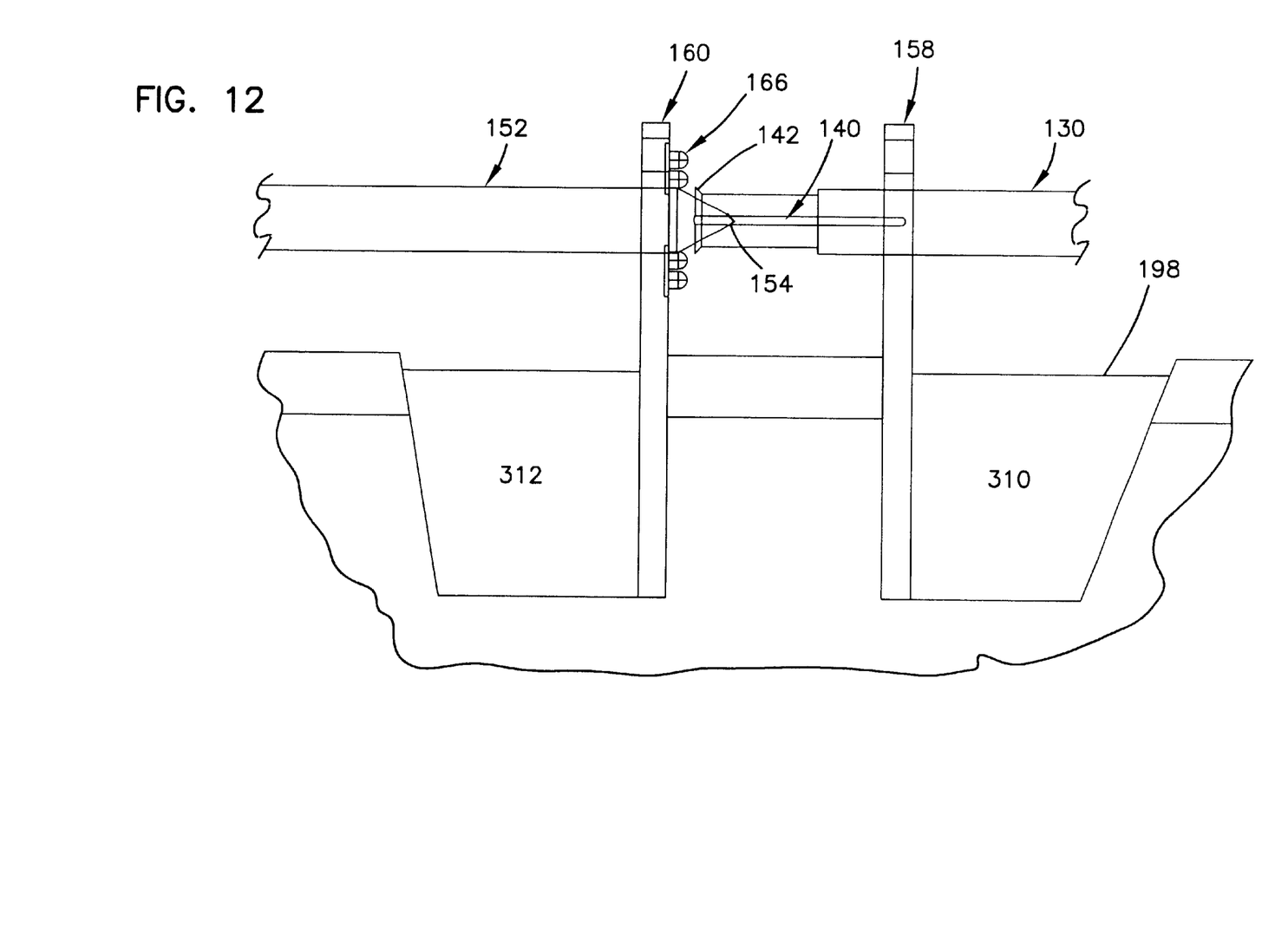
FIG. 12 is a more detailed view of a portion of a swaging fixture block supporting opposed plates having deswaging rod and actuator rod extending therethrough for operation.

FIG. 12 is a more detailed view of seat 198 and plates 158, 160 supported via plugs 310, 312 secured to fixture block 176. Placement of swaging flange 142 is precalibrated so that when rod 262 is in the engaging position, and contacts rod 130, flanged end 142 is positioned in gap 148 at center axis 150. Placement of the flanged end 142 is calibrated (prior to mounting "E" block 72 for operation) by a shim having a dimension equal to one-half the thickness of an actuator arm plus the mounting plate. The shim (not shown) is aligned with plate 160 and stroke rod 264 is positioned in the engaging position to advance the flanged end 142 of rod 130. The position of flanged end 142 is adjusted via calibration member 262 until flanged end 142 contacts the shim. Thus, member 262 has been used to calibrate stroke rod 264 so that the stroke rod 264 will consistently place flanged end 142 relative to center axis 150, when the stroke rod 264 is in the engaging position.

Figure 13:
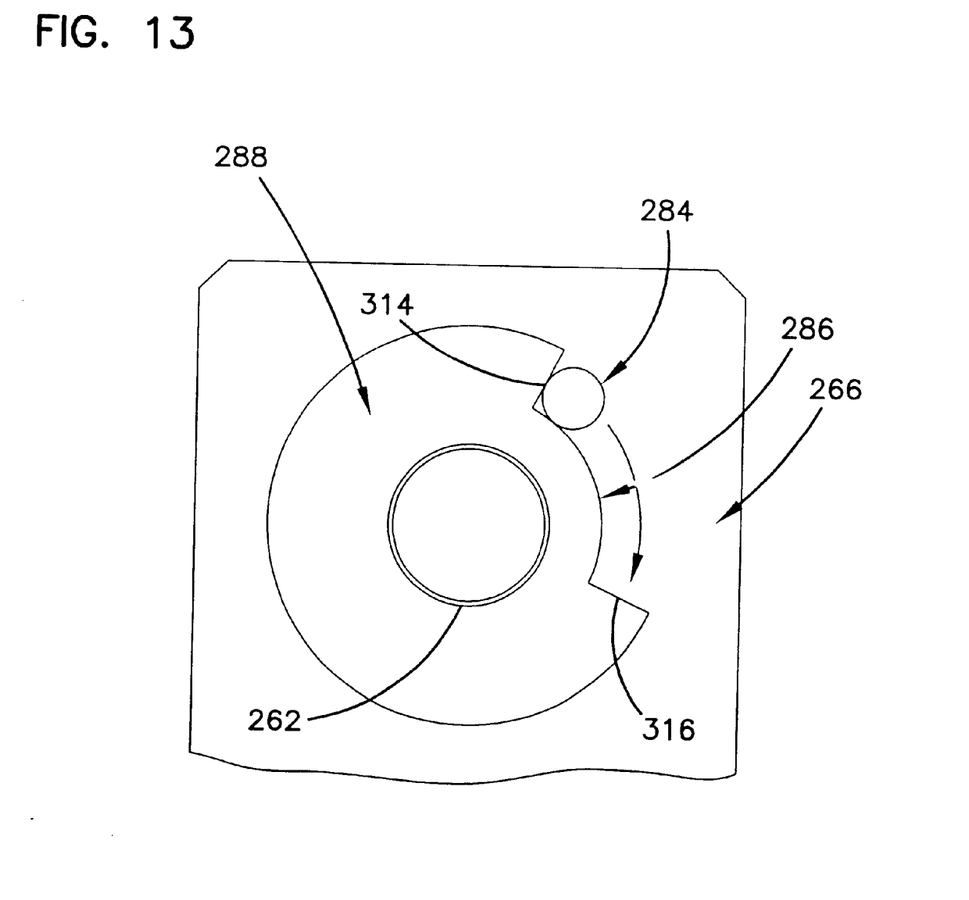
FIG. 13 is a view taken along line 13—13 of FIG. 11.

Stroke rod 264 is moved (via rotation) between the retracted position and the extended position to advance rod 130 along the deswaging stroke (i.e., between the operating position and the extended position). The extent of the stroke of rod 264 is defined via cooperation of control pin 284 movable within slot 286 of knob 288. FIG. 13 is a view taken along line 13—13 of FIG. 11. As shown, slot 286 includes first and second stroke ends 314, 316. Control pin 284 of rod 264 is aligned with and movable in slot 286 between first and second stroke ends 314, 316. The extent between stroke ends 314, 316 corresponds to the distance between the center axis 150 (i.e., operating position) and the extended position to remove a stake 118 (and mounting plate 112) from an actuator arm.

Figure 14:
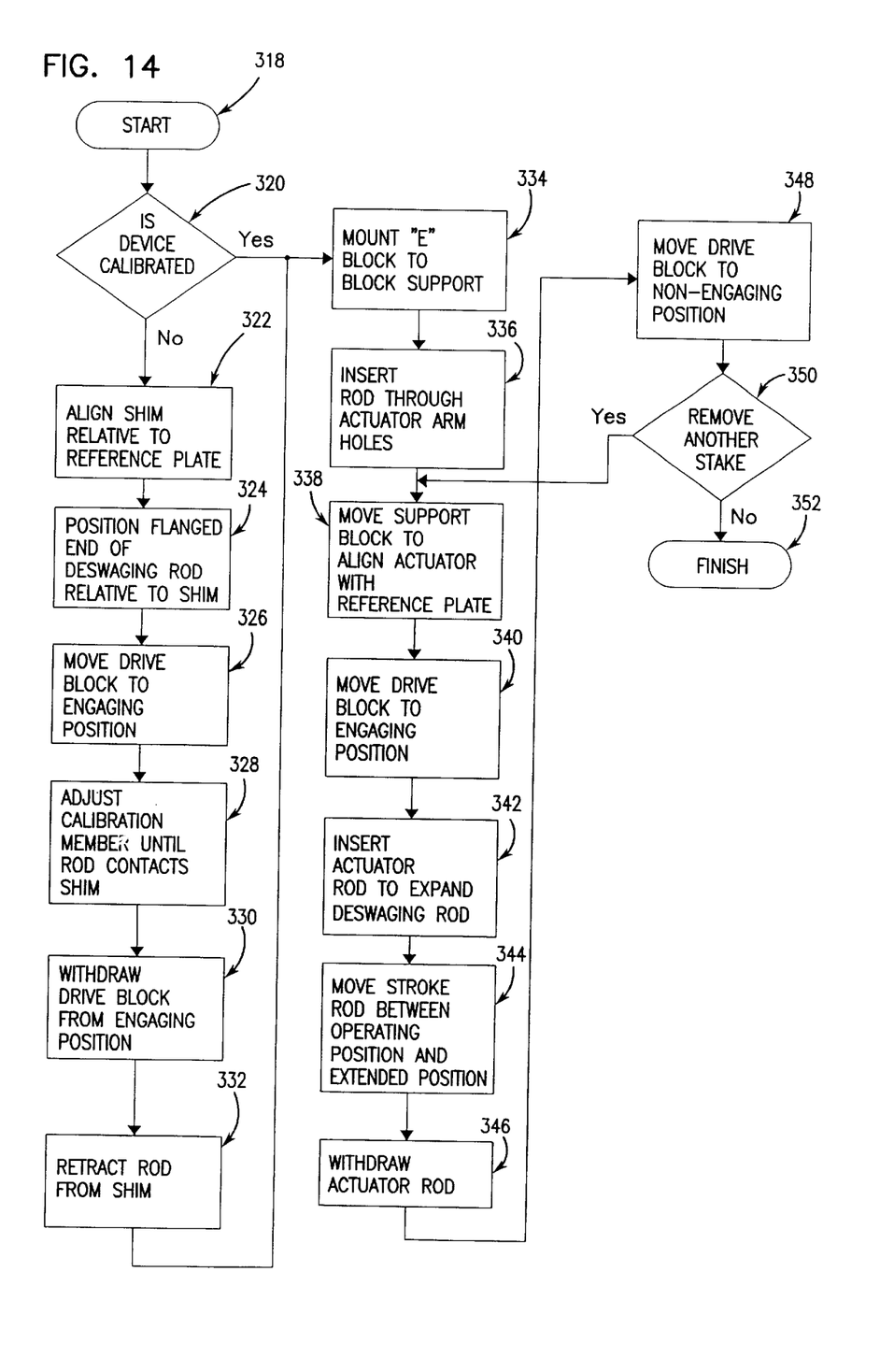
FIG. 14 is a flow chart illustrating operation of an embodiment of a deswaging apparatus of the present invention.

Thus, stakes may be removed from actuator arms as illustrated by the flow chart of FIG. 14. Commencement of operation is illustrated by block 318. As illustrated in FIG. 14, the stroke rod 264 is calibrated prior to operation as illustrated by block 320. To calibrate stroke rod 264, a shim is aligned with reference plate 160, as illustrated by block 322. Rod 130 is advanced towards the shim and drive block 266, supporting stroke rod 264 is moved to the engaging position to align stroke rod 264 with rod 130 as illustrated by blocks 324, 326. Calibration member 262 is adjusted to move stroke rod 264 and rod 130 to position flanged end 142 of rod 130 to abut the shim, as illustrated by block 328. Thereafter, drive block 266 is moved to the non-engaging position and rod 130 is withdrawn so that the rod does not interfere with mounting "E" block 72 for deswaging, as illustrated by blocks 330, 332.

Once the stroke rod 264 is calibrated, an "E"-block 72 may be mounted on block support fixture 174 as illustrated by block 334. Rod 130 is then inserted through holes 102 of actuator arms and drive block 266 supporting stroke rod 264 is moved to the engaging position as illustrated by blocks 336, 338. The position of the block support fixture 174 is adjusted via slide 214 to align mounting plate 112-1 (and stake 118-1 to be removed) with reference plate 160. The drive block 266 is moved to the engaging position to align stroke rod 264 for operation, as illustrated by block 340. Actuator rod 152 is inserted to expand rod 130 to the swaging dimension as illustrated by block 342. The stroke rod 264 is then advanced by rotating stroke rod 264 so that control pin 284 moves between stroke ends 314, 316 as illustrated by block 344 to remove the stake. After stake 118-1 is removed, actuator rod 152 is withdrawn, as illustrated by block 346, and the drive block 266 is moved to the non-engaging position, as illustrated by block 348.

If another stake is to be removed, as illustrated by block 350, the position of the block support fixture 174 is adjusted via slide 214 to align the next mounting plate relative to reference plate 160, and the deswaging process is repeated, as illustrated by blocks 338–348. Otherwise, operation is complete, as illustrated by block 352, and rod 130 is withdrawn to remove the "E"-block 72. As previously explained, in the insertion dimension, rod 130 is sized for insertion through channels 120 of stakes 118 and hole 102. For example, if the diameter of channel 120 is approximately 0.087 inches (2.208 mm), the maximum diameter of the flanged end 142 is approximately 0.086 inches (2.18 mm). The flange angle is preferably 30°. Preferably, the diameter of the second diameter portion 138 is 0.070 inches (1.7 mm), and the length of portion 138 is 0.15 inches (3.8 mm). The diameter of the first portion 136 is 0.086 inches (2.18 mm). The overall length of rod 130 is preferably 2.5 inches (63.5 mm). The length of slits 140 is preferably 0.25 inches (6.35 mm), and the thickness is approximately 0.010 inches (0.253 mm). The diameter of central bore 134 is 0.059 inches (1.49 mm), and the diameter of rod 152 is 0.086 inches (2.18 mm).

Thus, as described, the expandable device 130 of the present invention provides a device for removing a single suspension assembly staked to an actuator arm of an "E" block. In particular, the expandable device 130 includes a flanged end 142 defining a deswaging surface 144. The expandable device 130 is adapted to operate between an insertion dimension and a deswaging dimension. In the insertion dimension, the device 130 is sized for insertion through channels of tubular stakes 118 to Position the flanged end 142 relative to the end surfaces 124 of stakes 118. The expandable device is expanded to the deswaging dimension for operation. In the deswaging dimension, the flanged end 142 expands so that the deswaging surface 144 aligns with the end surface 124 to push the stake 118 out of the hole 102 of the actuator arm.

It is to be understood that, even though numerous characteristics and advantages of the various embodiments of the present invention have been set forth in the foregoing description together with details of the structure and functions of various embodiments of the invention, this disclosure is illustrative only; and changes may be made in detail, especially in the matters of structure and arrangement of parts within the principles of the present invention to the fullest extent indicated by the broad general meaning of the terms in which the pending claims are expressed. For example, the particular elements may vary, depending upon the particular application, while maintaining substantially the same functionality without departing from the scope and spirit of the present invention.

What is claimed is:

1. A method for detaching a suspension assembly adapted to support a head, staked to an actuator arm of an actuator block comprising the steps of:
   providing an expandable device including a flanged end having an insertion dimension;
   inserting the flanged end of the expandable device into a channel on the actuator arm;
   expanding the flanged end from the insertion dimension to an expanded dimension; and
   moving the expandable device in the expanded dimension after expanding the flanged end from the insertion dimension to the expanded dimension to force a stake from the actuator arm.

2. The method of claim 1 and further comprising:
   aligning the actuator arm relative to a reference member prior to the step of inserting the flanged end of the expandable device.

3. The method of claim 2 and further comprising:
   calibrating a position of the flanged end of the expandable device relative to the reference member; and
   advancing the flanged end along a stroke relative to the calibrated position of the flanged end relative to the reference member.

4. The method of claim 2 wherein the actuator block includes a plurality of actuator arms including a plurality of suspension assemblies staked thereto and further comprising the step of:
   selectively aligning the plurality of actuator arms relative to the reference member to remove the plurality of suspension assemblies staked to the plurality of actuator arms.

5. The method of claim 2 wherein the actuator block includes a plurality of actuator arms having a plurality of suspension assemblies staked thereto and further comprising the steps of:
   supporting the actuator block on a slide having a plurality of adjustable positions relative to the reference member; and
   moving the slide between the plurality of adjustable positions to remove the plurality of suspension assemblies from the plurality of actuator arms.

6. The method of claim 1 wherein the step of expanding the flanged end includes inserting a rod through a channel of the expandable device to expand the flanged end.

7. The method of claim 1 wherein the actuator arm includes opposed stakes having a gap between opposed ends of the opposed stakes and further comprising the step of:
   positioning the flanged end relative to the gap between the opposed stakes prior to expanding the flanged end.

8. The method of claim 7 and the step of positioning the flanged end relative to the gap further comprising the steps of:
   aligning the actuator arm relative to a reference member; and
   advancing the flanged end along a predetermined stroke to align the flanged end relative to the gap between the opposed stakes.

9. The method of claim 1 wherein the expandable device includes at least one slit along a longitudinal length thereof and the step of expanding the flanged end comprises:
   expanding the at least one slit to expand the dimension of the flanged end.

10. The method of claim 1 wherein the step of moving the expandable device moves the flanged end in a first direction and further comprising the step of:
    biasing the actuator arm in a second opposed direction to the first direction.

* * * * *